(12) United States Patent
Hayashi et al.

(10) Patent No.: US 6,563,241 B2
(45) Date of Patent: May 13, 2003

(54) A. C. GENERATOR FOR VEHICLES HAVING LOOSE-FREE TERMINAL STRUCTURE

(75) Inventors: Yoshinori Hayashi, Mie-gun (JP); Hitoshi Irie, Nagoya (JP)

(73) Assignee: Denso Corporation, Kariya (JP)

( * ) Notice: Subject to any disclaimer, the term of this patent is extended or adjusted under 35 U.S.C. 154(b) by 16 days.

(21) Appl. No.: 09/891,349

(22) Filed: Jun. 27, 2001

(65) Prior Publication Data

US 2001/0054853 A1 Dec. 27, 2001

(30) Foreign Application Priority Data

Jun. 27, 2000 (JP) ........................................ 2000-193099

(51) Int. Cl.$^7$ ................................................. H02K 5/00
(52) U.S. Cl. ........................... 310/71; 310/68 D; 310/89
(58) Field of Search ................... 310/71, 68 D, 310/89

(56) References Cited

U.S. PATENT DOCUMENTS

| 4,362,351 A | * | 12/1982 | Wible | .......................... 439/738 |
| 5,229,675 A | * | 7/1993 | Gotoh | ....................... 310/68 D |
| 5,266,857 A | * | 11/1993 | Gotoh | ....................... 310/68 D |
| 5,315,195 A | * | 5/1994 | Bradfield et al. | .............. 310/89 |
| 5,331,231 A | * | 7/1994 | Koplin et al. | .............. 310/68 D |
| 5,453,648 A | * | 9/1995 | Bradfield | ................... 310/68 D |
| 6,150,741 A | * | 11/2000 | Hayashi et al. | ........... 310/68 D |

FOREIGN PATENT DOCUMENTS

| EP | 521399 A2 | * | 1/1993 | ............ H02K/5/22 |
| EP | 521493 A2 | * | 1/1993 | |
| EP | 562909 A1 | * | 9/1993 | ............ H01R/4/30 |
| GB | 2235822 A | * | 3/1991 | ........... H01L/25/11 |
| JP | 31500040 A | * | 6/1991 | |
| JP | 4-165949 | | 6/1992 | |
| JP | 9-107654 | | 4/1997 | |
| WO | WO 9103836 A1 | * | 3/1991 | ............ H01L/25/11 |

* cited by examiner

Primary Examiner—Joseph Waks
(74) Attorney, Agent, or Firm—Oliff & Berridge, PLC

(57) ABSTRACT

In an a.c. generator for vehicles, an output terminal connected to a rectifier circuit unit has a seat surface on which an electric cable for connection with a storage battery is seated. The seat surface is positioned outside a rear cover and an insulating member in the longitudinal direction of the output terminal. The electric cable is tightened to the seat surface by a nut engaged with the output terminal, while holding the electric cable from contacting the insulating member. Thus, the insulating member is restricted from being deformed and the nut is restricted from loosening even when the insulating member contracts.

10 Claims, 4 Drawing Sheets

A. C. GENERATOR FOR VEHICLES HAVING LOOSE-FREE TERMINAL STRUCTURE

CROSS REFERENCE TO RELATED APPLICATION

This application is based on and incorporates herein by reference Japanese Patent Application No. 2000-193099.

BACKGROUND OF THE INVENTION

The present invention relates to an alternating current (a.c.) generator, which is mounted on passenger cars, trucks or the like.

In one a.c. generator disclosed in JP-A-9-107654, an insulating busing is fit on an output terminal, which is connected to a storage battery via an electric cable. The top end of the cable is sandwiched between a pair of nuts. One nut tightens the bushing and the other nut presses the top end of the cable to the tightening nut. According to this construction, the nut tends to loosen when the bushing contracts during use.

In another a.c. generator disclosed in JP-A-4-165949, a part of a positive-side heat sink (heat radiation fin) of a rectifier circuit unit is extended along an output terminal, which is connected to a storage battery via an electric cable. A nut is fit on the output terminal so that the top end of the cable is held in contact with the extended part of the heat sink. A resin bushing is fit on the extended part. According to this construction, the heat sink must be shaped in a complicated form and the bushing must be sized large. Further, the bushing tends to dislocate, because the nut does not tighten the bushing.

SUMMARY OF THE INVENTION

It is therefore an object of the present invention to provide an a.c. generator, which is simple in construction and restricts loosening of a nut.

According to the present invention, an a.c. generator has a rectifier circuit unit and an output terminal unit for connecting the rectifier circuit unit to a storage battery through an electric cable. A rear cover covers the rectifier circuit unit. The output terminal unit extends outward through a fitting hole of the rear cover. An insulating member is fit between the fitting hole and the output terminal unit. A tightening member is engaged with the output terminal unit to tightly fix the electric cable to the output terminal unit. The output terminal unit has a seat surface formed outside the rear cover and the insulating member in a longitudinal direction of the output terminal unit and a threaded part formed near the seat surface. The tightening member is engaged with the threaded part of the output terminal unit to tightly fix the electric cable to the seat surface.

Preferably, the output terminal unit includes an output terminal formed with the threaded part and a first nut engaged with the threaded part to fix the output terminal to the rectifier circuit unit. The first nut has an axial end surface, which provides the seat surface for the electric cable. The tightening member includes a second nut engaged with the threaded part sandwiching the electric cable to the first nut. The axial length of the first nut is longer than that of the insulating member. The fitting hole is shaped to restrict the insulating member from turning.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
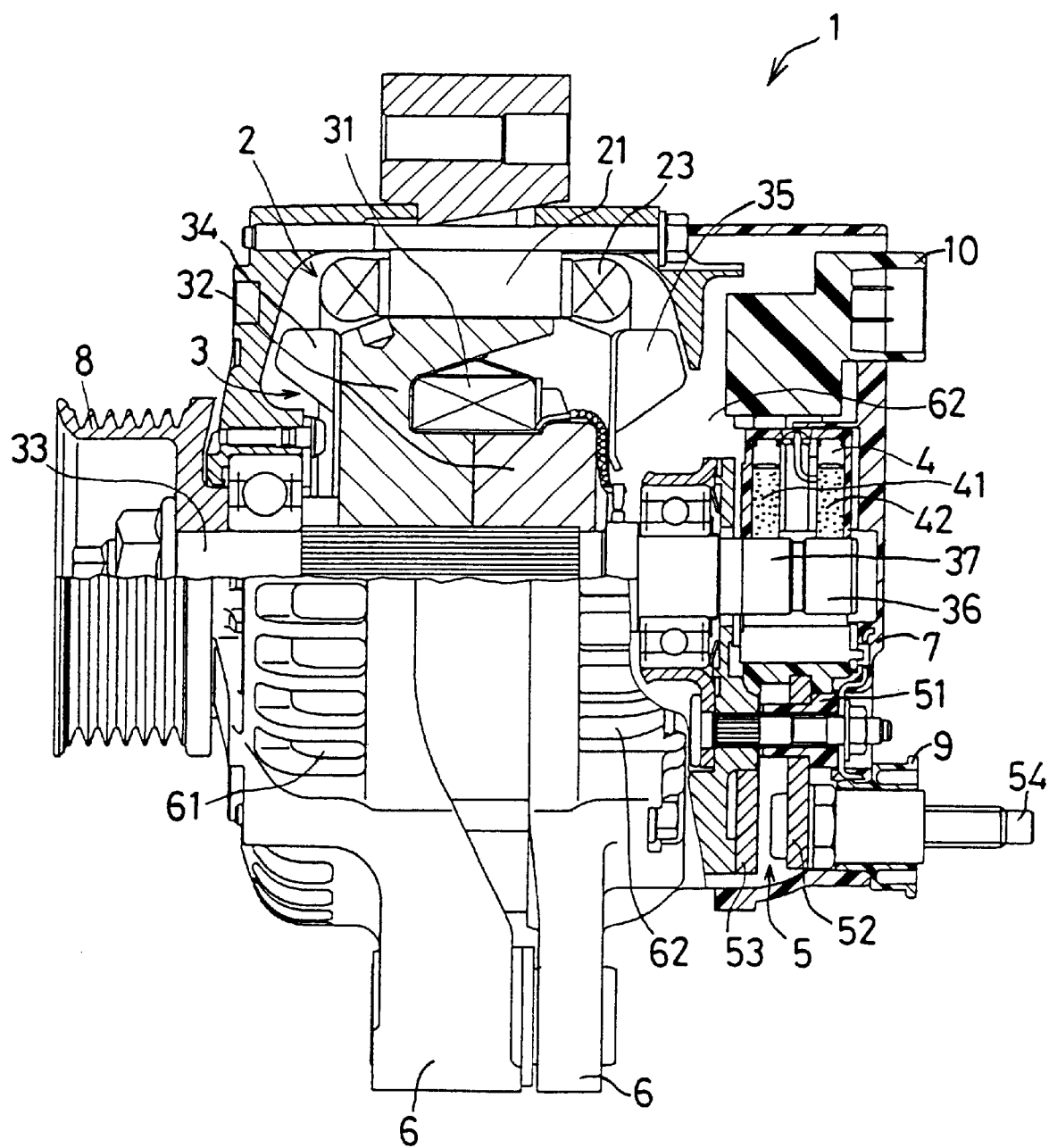
FIG. 1 is a side view showing, partly in section, an a.c. generator according to an embodiment of the present invention.

Referring first to FIG. 1, an a.c. generator 1 comprises a stator 2, a rotor 3, a brush device 4, a rectifier circuit unit 5, frames 6, a rear cover 7, a pulley 8, an IC regulator 10 and the like.

The stator 2 has an iron core 21 having a plurality of slots, and a three-phase stator windings 23 wound in the slots at regular angular intervals.

The rotor 3 has a field winding 31, a pair of pole cores 32 wound with the field winding 31, and a shaft 33 fit in the pole cores 32. Each core 32 has six pole pieces. An axial flow-type cooling fan 34 is welded to the side surface of the front-side (left side in the figure) pole core 32 to suck air from the front side and discharges the same in both axial and radial directions. A centrifugal flow-type cooling fan 35 is welded to the side surface of the rear-side (right side in the figure) pole core 32 to such air from the rear side and discharges the same in the radial direction.

The brush device 4 has a pair of brushes 41 and 42, which are pressed to contact slip rings 36 and 37 provided on the shaft 33 of the rotor 3, respectively. The brush device 4 supplies a field current from the rectifier circuit unit 5 to the field winding 31 of the stator 3.

The rectifier circuit unit 5 has a terminal pedestal 51 including wiring electrodes therein, a positive-side heat radiation fin 52 supporting a set of rectifiers (not shown), and a negative-side heat radiation fin 53 supporting another set of rectifiers (not shown). The positive-side heat radiation fin 52 supports an output terminal 54 for connection with a storage battery (not shown). The rectifiers supported on the heat radiation fins 52 and 53 full-wave rectify the three-phase a.c. voltages generated from the three-phase stator windings 23. An insulating bushing 9 made of a resin is fit around the output terminal 54.

The frames 6, which is used as a housing, accommodates the stator 2 and the rotor 3 therein and rotatably support the shaft 33 of the rotor 3. The stator 2 is fixed to the internal peripheral surfaces of the frames 6 at a position radially outside the rotor 3. A plurality of outlet openings 61 is formed in the front-side frame 6 for discharging cooling air at a position radially outside the stator windings 23 protruding from the front-side axial ends of the iron core 21. A plurality of inlet openings 62 is formed in the rear-side frame 6 for sucking cooling air from the outside at a position radially outside the stator windings 23 protruding from the rear-side axial ends of the iron core 21.

The rear cover 7 is fixed to the rear-side frame 6 to cover the brush device 4, the rectifier circuit unit 5 and an IC regulator 10.

As known well in the art, the rotor 3 rotates with a rotating force transmitted from an internal combustion engine (not shown) to the pulley 8 through a belt or the like. When the field current is supplied to the field winding 31 of the rotor 3, the pole pieces of the pole cores 32 are alternately magnetized in opposite polarities in the circumferential direction of the rotor 3. As the thus magnetized pole pieces rotate, the stator windings 23 generate three-phase a.c. voltages. These a.c. voltages are full-wave rectified to a direct current (d.c.) voltage, which is supplied from an output terminal 54 to a storage battery through an electric cable (not shown).

Figure 2:
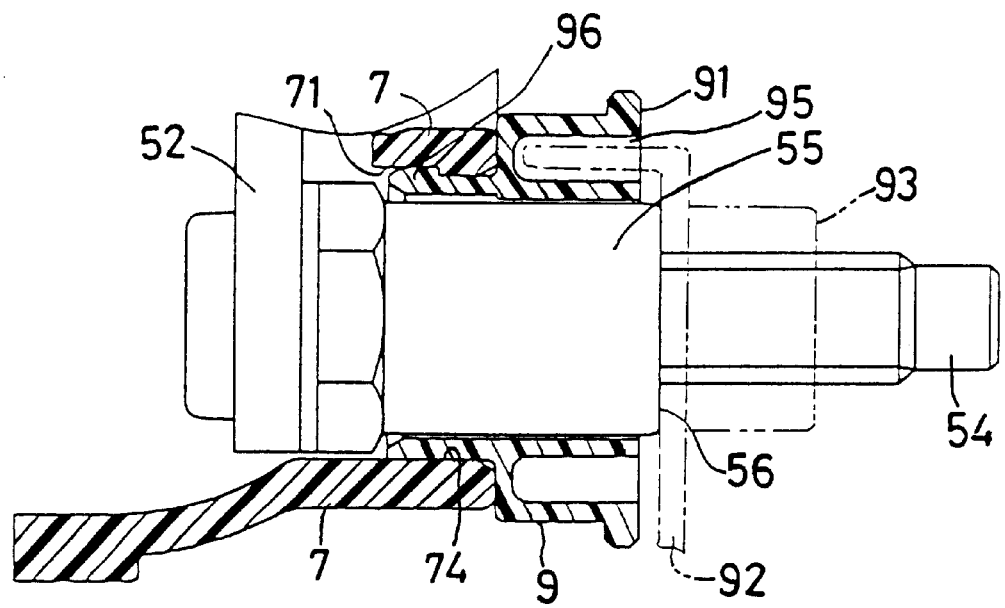
FIG. 2 is a sectional view showing an output terminal, bushing and other component parts shown in FIG. 1.

As shown in FIG. 2, the output terminal 54 is knurled near its bottom part. After inserting the knurled part into a through hole formed in the end of the positive-side radiation fin 52, the output terminal 54 is tightened to the radiation fin 52 by a metal nut 55. The axial length of the nut 55 is set longer than the corresponding axial length of the bushing 9 so that the seat surface 56 (right-side end surface in the figure) of the nut 55 is above the end surface of the bushing 9 in the longitudinal direction of the output terminal 54. That is, the nut 55 protrudes outside the bushing 9 in the axial direction after the busing 9 is fit on the nut 55. As a result, when an electric cable 92 for connection with the battery is fixed to the seat surface 56 by a metal nut 93, only the nut 55 exists between the electric cable 92 and the radiation fin 52. That is, the bushing 9 is interposed without being pressed to the radiation fin 52 by the nut 93. Therefore, the nut 93 is restricted from being loosening even when the bushing 9 contracts.

The bushing 9 is shaped in a cylinder, which has the inner diameter generally equal to the outer diameter of the nut 55. The bushing 9 has protrusions 96, which protrude in the radial direction from the outer peripheral surface of the bushing 9 at a plurality of locations. The protrusions 96 operate as hooks and fit in recesses 71 formed in the inner peripheral surface of a fitting hole 74 of the rear cover 7. Thus, the bushing 9 is restricted from moving in the axial direction by the engagement of the protrusions 96 in the recesses 71.

Figure 3:
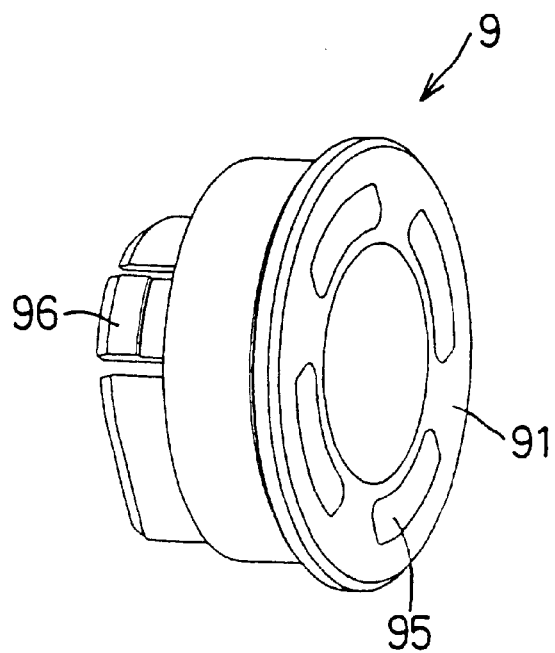
FIG. 3 is a perspective view showing the bushing shown in FIGS. 1 and 2.
Figure 4:
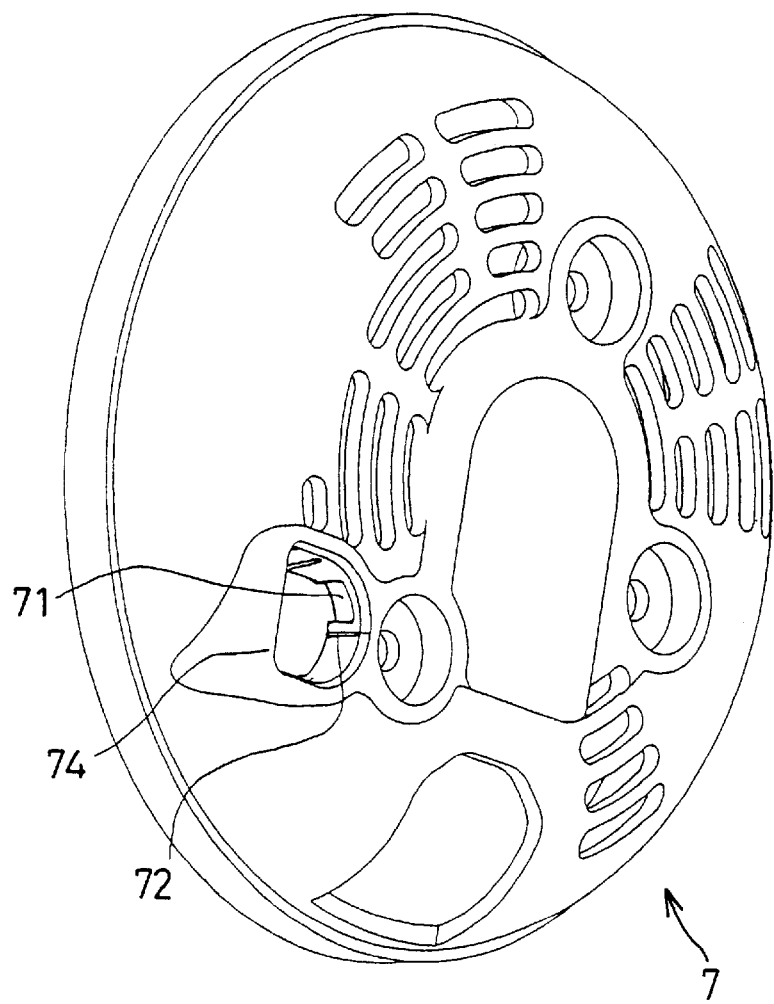
FIG. 4 is a perspective view showing a rear cover shown in FIG. 1.

Further, as shown in FIGS. 2 and 3, the bushing 9 is formed with a recess 95 in its axial end surface 91 so that the end of the electric cable 92 is inserted in the recess 95 and restricted from turning around the output terminal 54. In this instance, the recess 95 should be positioned at a predetermined angular position. However, the nut 93 tends to turn the bushing 9 around the output terminal 93 when tightened to fix the electric cable 92 to the nut 55. Therefore, as shown in FIG. 4, the fitting hole 74 of the rear cover 7 is shaped generally to have a straight part and an arcuate part like an alphabet D, and the bushing 9 is shaped in the similar form corresponding to the fitting hole 74. Thus, the recess 95 of the bushing 9 can be positioned readily and accurately at the desired angular position, and the bushing 9 is restricted from turning around the output terminal 54. The fitting hole 74 of the rear cover 7 and the bushing 9 may be in any form other than the D-shape, as long the bushing 9 is restricted from turning around the output terminal 54.

The above embodiment may be modified in many other ways.

Figure 5:
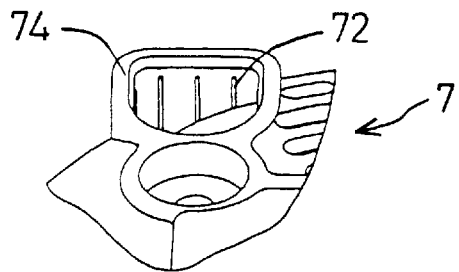
FIG. 5 is a perspective view showing small protrusions of the rear cover according to a modification of the embodiment shown in FIG. 4.
Figure 6:
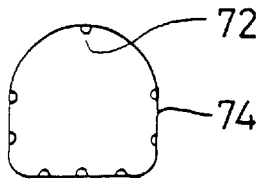
FIG. 6 is a front view showing the small protrusions of the rear cover shown in FIG. 5.

For instance, as shown in FIGS. 5 and 6, the fitting hole 74 of the rear cover 7 is formed with a plurality of small parallel longitudinally-extending protrusions 72 on its inner wall surface. Each protrusion 72 is sized to have a height, with which the protrusion 72 continuously contacts the outer wall of the bushing 9. Thus, the centers of the fitting hole 74 and the bushing 9 are aligned, and hence the recesses 71 of the rear cover 7 and the protrusions 96 of the bushing 9 can be engaged to each other. Further, each protrusion 72 extends in the longitudinal direction of the output terminal 54. As a result, the bushing 9 is slid into the fitting hole 74 to be assembled with the rear cover 7 without applying a large force, because the bushing 9 only partly contacts the rear cover 7 at the protrusions 72.

Figure 7:
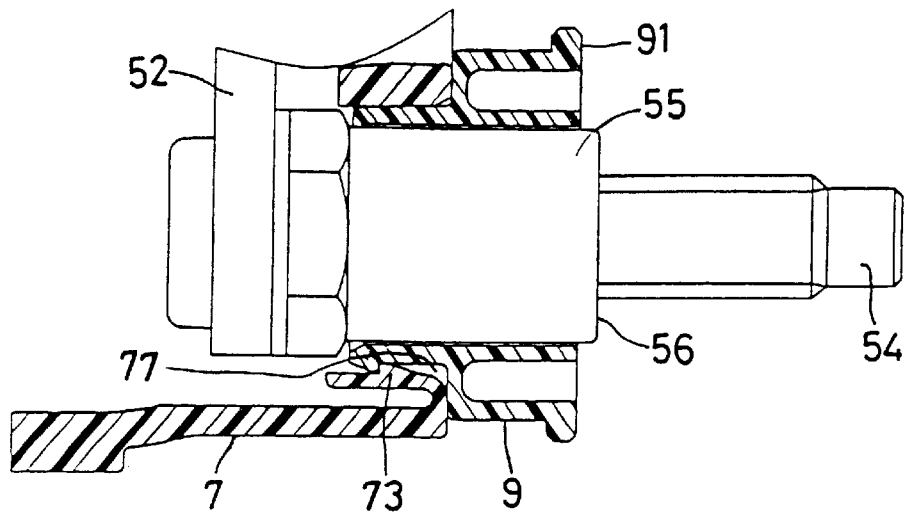
FIG. 7 is a sectional view showing an output terminal, bushing and other component parts according to another modification of the embodiment shown in FIG. 2.
Figure 8:
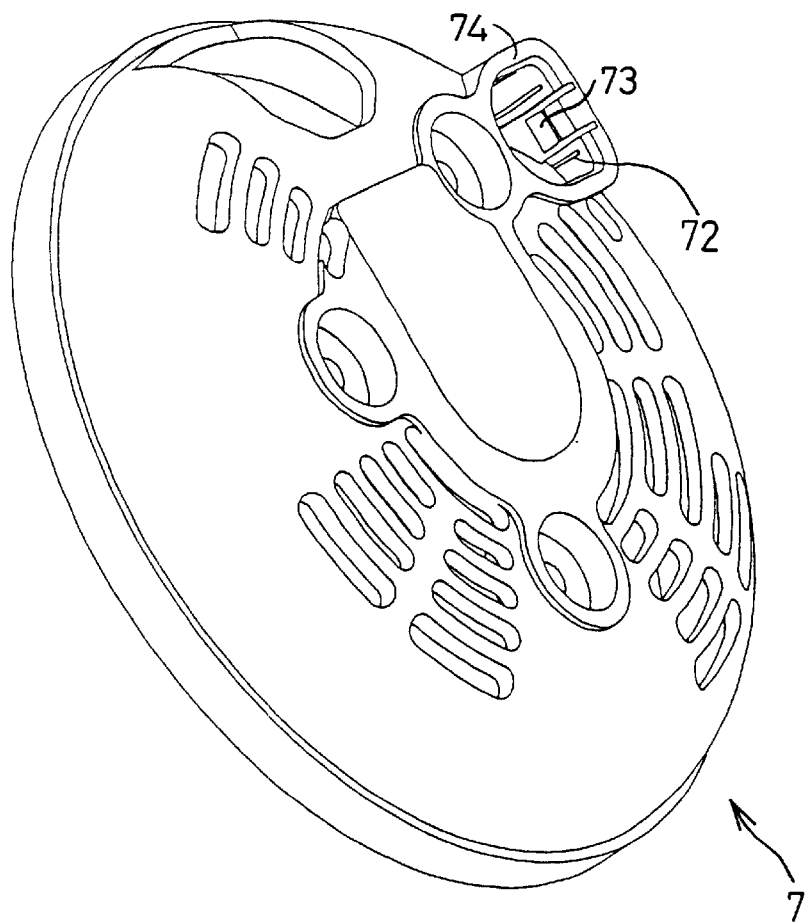
FIG. 8 is a perspective view showing a rear cover used in a further modification of the embodiment shown in FIG. 4.

In addition, as shown in FIGS. 7 and 8, the bushing 9 is formed with a recess 77 on a part of its outer peripheral surface, and the fitting hole 71 is formed with a protrusion 73. With the engagement of the protrusion 73 with the recess 77, the bushing 9 is restricted from moving in the longitudinal direction of the output terminal 54.

The present invention should not be limited to the disclosed embodiment and modifications, but may be implemented in various ways without departing from the spirit of the invention.

What is claimed is:

1. An a.c. generator, comprising:
    a housing;
    a rectifier circuit unit fixed to the housing;
    a rear cover fixed to the housing to cover the rectifier circuit unit and having a fitting hole;
    an output terminal unit tightened to the rectifier circuit unit and extending outward through the fitting hole of the rear cover;
    an insulating member fit in the fitting hole of the rear cover and fit around the output terminal unit, wherein the insulating member is separate from the rear cover;
    an electric cable for connection with the output terminal unit; and
    a tightening member for tightening the electric cable to the output terminal unit, wherein the output terminal unit has a seat surface formed outside the rear cover and the insulating member in a longitudinal direction of the output terminal unit and a threaded part formed near the seat surface, and the tightening member is engaged with the threaded part of the output terminal unit to tightly fix the electric cable to the seat surface.

2. The a.c. generator as in claim 1, wherein
    the output terminal unit includes an output terminal formed with the threaded part and a first nut engaged with the threaded part to fix the output terminal to the rectifier circuit unit, the first nut having an axial end surface which provides the seat surface for the electric cable and
    the tightening member includes a second nut engaged with the threaded part sandwiching the electric cable to the first nut.

3. The a.c. generator as in claim 1, wherein the insulating member and the rear cover has respective engagement parts which engage with each other to restrict the insulating member from moving in the longitudinal direction of the output terminal unit and the engagement parts restrict the movement in both longitudinal directions.

4. The a.c. generator as in claim 3, wherein the engagement parts include a recess and a protrusion which are formed on an outer surface of the insulating member and an inner surface of the rear cover to be engageable with each other.

5. The a.c. generator as in claim 1, wherein the fitting hole of the rear cover is shaped in a form which restricts the insulating member from turning around the output terminal unit.

6. The a.c. generator as in claim 5, wherein the fitting hole has a straight part and a non-straight part to restrict the insulating member from turning.

7. The a.c. generator as in claim 5, wherein the fitting hole has a plurality of parallel longitudinally-extending protrusions on its inner surface so that the insulating member contacts only the protrusions when inserted in the fitting hole.

8. The a.c. generator as in claim 1, wherein the insulating member is shaped in generally a cylindrical form and has a recess on its axial end surface to receive therein an end of the electric cable and the recess extends in the longitudinal direction of the output terminal unit to receive the end of the cable in the longitudinal direction.

9. The a.c. generator as in claim 1, wherein the seat surface of the output terminal unit is positioned outside an axial end surface of the insulating member so that the electric cable is held separated from the insulating member when the electric cable is held in contact with the seat surface.

10. The a.c. generator as in claim 2, wherein the axial length of the first nut is longer than that of the insulating member so that the electric cable is held separated from the insulating member when the electric cable is held in contact with the seat surface.

* * * * *